Harry Vorgan,
INVENTOR.

Nov. 1, 1960 H. VORGAN 2,958,357

COLLAPSIBLE COVER

Filed April 3, 1959 2 Sheets-Sheet 2

Harry Vorgan,
*INVENTOR.*

United States Patent Office 2,958,357

Patented Nov. 1, 1960

2,958,357

COLLAPSIBLE COVER

Harry Vorgan, 1252 S. Rimpau Blvd., Los Angeles 19, Calif.

Filed Apr. 3, 1959, Ser. No. 803,994

5 Claims. (Cl. 150—52)

The present invention relates to covers, and more particularly to collapsible or foldable covers for use in enclosing or covering various articles such as equipment, appliances, food and other products. It is especially adapted to provide a collapsible cover member for enclosing and protecting phonograph record players, electric appliances, foods and the like in order to protect them from dust, sunlight, insects and other foreign objects.

Protective covers suitable for use as enclosures for equipment such as phonograph record players or to enclosures for protecting various other articles against the effect of sunlight, insects, dust, etc. are generally made in a predetermined size and shape and in a rigid structure. The result is a bulky product which is difficult to store when not in use, and represents a problem in shipping and handling as well. Phonograph record players, such as commonly used in high fidelity record playing systems and the like, are generally supported on a base and their upper record playing area which includes a turn table and pick-up arm plus record changing mechanisms where provided, are generally kept uncovered, since such covers are ordinarily not provided, or if a cover is provided it is generally of the preformed rigid type which is bulky and inconvenient to handle and also takes up a great deal of space when the player is in use. For this reason owners of record playing equipment generally prefer to avoid the use of such covers in view of their inconvenience and bulk.

In accordance with the present invention, applicant has devised a collapsible cover member which is light in weight yet provides adequate protection when applied in unfolded condition. It is readily collapsed and reassembled and in its collapsed form provides a flat compact unit which can be shipped or stored or otherwise handled prior to or after sale thus providing a great deal of convenience and savings in cost to the shipper, seller and user.

It is therefore an object of the present invention to provide a collapsible cover member adapted to be folded to a flat compact unit and unfolded to provide a substantially rigid enclosure.

It is a further object of the present invention to provide such a cover member formed of flexible material with a rigid frame member which is easy to adjust and can be readily folded when not in use and unfolded for use.

It is a still further object of the present invention to provide an attractive ornamental and utilitarian collapsible cover member which is inexpensive to produce and yet which provides effective protection to members enclosed thereby.

Other objects of the invention will become apparent from a consideration of the attached drawings and the specification which follows.

Figure 3:
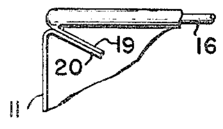
Fig. 3 is an enlarged view in perspective illustrating a corner construction.
Figure 3A:
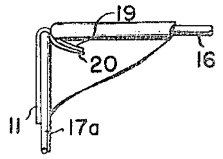

Fig. 3*a* is an enlarged view corresponding to Fig. 3 showing the frame in position.

Figure 2:
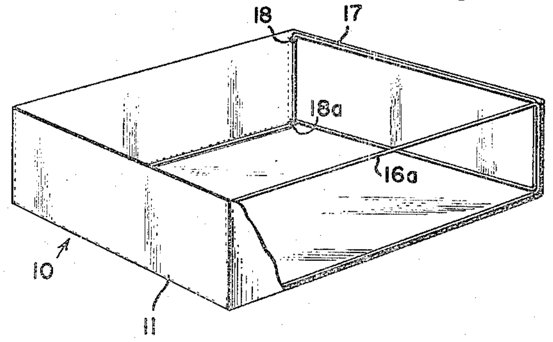
Fig. 2 is a view in elevation illustrating the structure of the assembled unit as it is ready for use, with a section broken away to illustrate frame construction.
Figure 4:
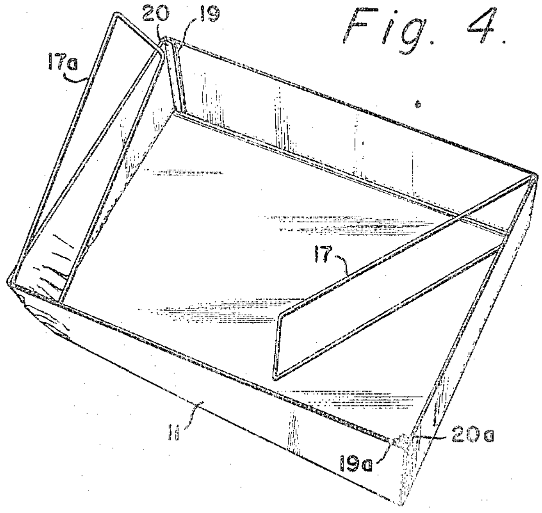

Fig. 4 is a view in elevation illustrating the assembly of Fig. 2 showing the assembly just prior to completion of the unfolding step or initiation of the folding operation.

Figure 5:
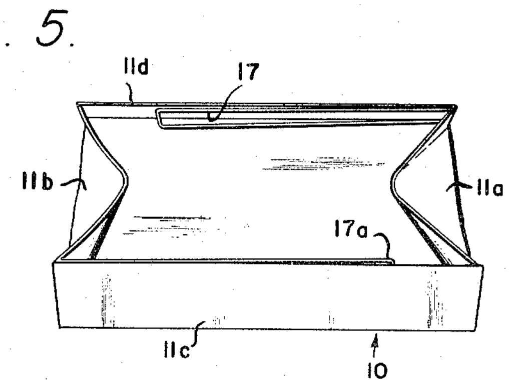

Fig. 5 is a view in elevation showing the assembly in partially folded condition.

Figure 6:
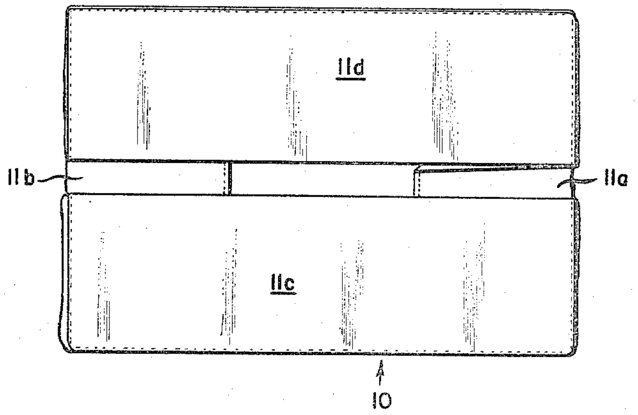

Fig. 6 is a view in elevation showing the assembly in a folded flat condition prior to the final fold.

Figure 7:
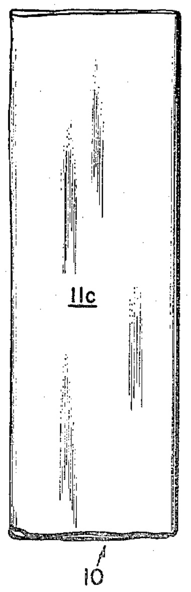

Fig. 7 is a view in elevation showing the assembly in its fully folded position.

Figure 8:
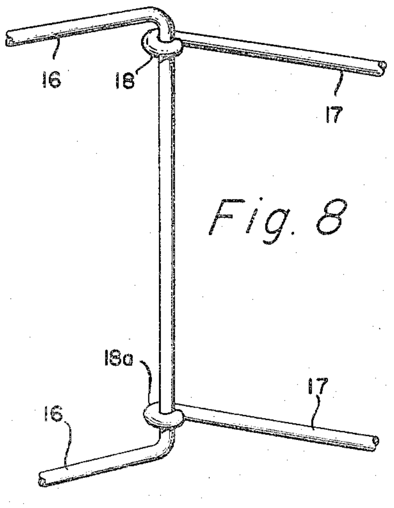

Fig. 8 is an enlarged detail view showing the hinge construction illustrated in Fig. 4.

Figure 1:
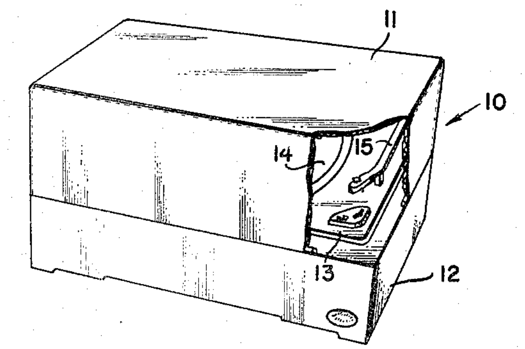
Figure 1 is a view in perspective illustrating the product of the invention in use enclosing a phonograph record playing unit.

As shown in the drawings, in Fig. 1 assembled cover member 10 of the invention composed of flexible sheet material 11 on a frame is shown positioned over the base of a phonograph record player 12 enclosing the unit which includes a base 13, turntable 14 and arm 15.

As shown in Fig. 2, the assembled cover 10 consists of a layer of flexible sheet material 11. This sheet material may be of plastic coated fabric or of fabric alone or sheet plastic material alone and is preferably of a flexible nature. Fabric backed plastic such as vinyl coated fabric is a highly satisfactory material for use in making this product. Rectangular frame elements 16 and **16*a*, preferably formed of wire, are attached at opposite sides of the fabric member which has first been sewed to a box-like configuration with a bottom, sides and ends. The frame for supporting the cover is formed of rectangular elements 16 and 16*a* and U-shaped members 17 and 17*a* (Fig. 4) attached at opposite corners to side edges of frame member 16 and/or 16*a*. Preferably members 17 and 17*a* are hinged respectively to opposite diagonal corners to facilitate folding as illustrated in greater detail in Figs. 4 through 7, however, if desired, they may be attached to opposite sides of the same rectangular frame section. Members 17 and 17*a* as shown are preferably U-shaped, the ends of each leg of the U being hinged to the adjacent frame section by bending over the ends to form loops as at 18 and 18*a* of member 17 which surround and engage the side edge of the frame 16. The corners of the flexible cover member opposite the points where the end members are hinged to the frame are formed with edge seams as shown in Fig. 3, in which side edges 19 and 20** are sewed together to form an inwardly projecting strip at the corresponding corner. The purpose of this is illustrated in Figs. 3 and 3*a* which show the cover structure before and after insertion of the side frame members, wherein the hinged segment of the frame is accommodated at its base by engagement with a pocket defined by the sewed joint thus helping to hold it in position. At the same time an interlocking fit is obtained with the adjacent segment of the rectangular frame which is attached to the adjacent sides of the cover since, as shown, the base portion of **17*a* is engaged between the covered end of 16 and fabric 11**.

The assembly of the hinged frame members is further illustrated in Fig. 4 in which segment **17*a* is shown in position as its base is inserted or about to be removed from engagement with the pocket formed by the seam 19, 20 while the corresponding hinged frame segment 17 is shown as it is positioned after or prior to engagement with the corresponding seam 19*a*, 20*a***.

The folding of the device is further illustrated in Figs. 5, 6 and 7. As shown in Fig. 5, the hinged frame segments are drawn flat against the corresponding sides after they are lifted out of engagement with the corners as shown in Fig. 4. At this point the ends 11*a* and 11*b* of the cover are left unsupported and tend to collapse inward as shown. Reinforced sides 11*c* and 11*d* are then folded downward into flat position over the bottom of the enclosure resulting in the structure shown in Fig. 6 in which all four sides are shown in flattened position with 11*a* and 11*b* folded underneath 11*c* and 11*d*. The folding may then be continued by folding 11*c* over 11*d* or vice-versa, resulting in the structure illustrated in Fig. 7.

In reassembling the cover, the above operations are reversed and the assembly is returned to partially opened position as illustrated in Fig. 5. End segments 17 and 17*a* are then inserted into position adjacent to the corresponding corner seams as shown for example in Fig. 4. Due to the flexibility of the material and the fact that the end segments are hinged as described, each segment may be raised sufficiently so its corner first engages the top area of the corner and it can then be forced into position bringing the sides of the cover taut and making the entire side assembly relatively rigid. The final product is that shown in Fig. 2 which can then be positioned over a suitable object such as a record player as shown in Fig. 1.

Instead of application to record players, covers of the type described may be used to cover kitchen appliances, foods, such as cake or hot or cold foods contained in dishes to protect such products from dust, insects and the like. Due to the compact flattened nature of the folded unit, any number of these may be easily stored in drawers or in other convenient places without occupying the excess space normally required by conventional rigid covers.

While the foregoing description refers to a preferred embodiment of the invention, other modifications will be apparent to those skilled in the art as coming within the scope of the present invention.

I claim:

1. A collapsible cover comprising a rectangular box-like structure formed of flexible sheet material having a top, side walls, end walls and an open bottom, a pair of relatively rigid rectangular frame members each of which is attached to a side wall, a pair of relatively rigid reinforcing members each of which is hinged at one side edge to an adjacent frame member and is unattached to said end walls and is thereby adapted to engage said end walls while the assembly is in open position and foldable against said frame members when the assembly is in folded position.

2. A cover according to claim 1 wherein means are provided for engaging the reinforcing members at a corner of said cover and adjacent to the side of said frame member opposite to that at which the reinforcement is hinged.

3. A cover according to claim 1 wherein reinforcing members are hinged to said frame members at diagonally opposite corners of the structure.

4. A cover according to claim 3 wherein the means for engaging the reinforcing members comprise seams formed at the corner of the cover by sewing adjacent strips of said material together.

5. A collapsible enclosure comprising a box-like member formed of flexible sheet material provided with a bottom, side walls, and end walls, a first pair of rigid frame members each attached to and supporting a side wall, said side wall and its frame member being foldable at one longitudinal edge thereof over said bottom, and a second pair of rigid frame members, each of which is hinged at one end thereof to the end of one of said first frame members and is unattached to said end walls, said second frame members being foldable against said first frame members leaving the end walls unsupported whereby said end walls are foldable inward and downward against said bottom and said side walls are foldable thereover, said bottom being thereafter foldable at an intermediate point thereof between said folded side walls.

References Cited in the file of this patent

UNITED STATES PATENTS

| | | |
|---|---|---|
| 608,998 | Apthorp | Aug. 16, 1898 |
| 716,231 | Hoffmann | Dec. 16, 1902 |
| 1,135,892 | Grosenbeck | Apr. 13, 1915 |
| 2,315,001 | Logan | Mar. 30, 1943 |
| 2,655,970 | Terry | Oct. 20, 1953 |